United States Patent [19]

Hausberg et al.

[11] 3,854,908
[45] Dec. 17, 1974

[54] APPARATUS FOR DISCHARGING FLUE GASES FROM BLAST FURNACES AND THE LIKE

[75] Inventors: Gerhard Hausberg, Essen-Bredeney; Karl-Rudolf Hegemann, Essen-Bergerhausen, both of Germany

[73] Assignee: Gottfried Bischoff Bau kompl. Gasreinigungs- und Wasserruckkuhlanlagen Kommanditgesellschaft, Essen, Germany

[22] Filed: Mar. 28, 1973

[21] Appl. No.: 345,762

Related U.S. Application Data

[63] Continuation-in-part of Ser. No. 235,208, March 15, 1972.

[30] Foreign Application Priority Data

Mar. 16, 1971 Germany.............................. 2112541
May 11, 1971 Germany.............................. 2123338
Mar. 30, 1972 Germany.............................. 2215565

[52] U.S. Cl............... 55/210, 55/226, 261/DIG. 54, 261/116
[51] Int. Cl............................................ B01d 47/06
[58] Field of Search ............ 55/210, 226, 240, 241; 261/DIG. 54, 116, 62, 43

[56] References Cited
UNITED STATES PATENTS

| 1,128,177 | 2/1915 | Moser................................. 55/240 |
| 3,199,267 | 8/1965 | Hausberg............................ 55/210 |
| 3,626,672 | 12/1971 | Burbidge............................ 55/240 |
| 3,638,925 | 2/1972 | Braemer...................... 261/DIG. 54 |
| 3,726,065 | 4/1973 | Hausberg et al...................... 55/226 |

Primary Examiner—Bernard Nozick
Attorney, Agent, or Firm—Karl F. Ross; Herbert Dubno

[57] ABSTRACT

Flue gases from a high-pressure blast furnace are led from above into a vertical duct terminating in a tubular nozzle with a downwardly converging section and an adjoining cylindrical (or prismatic) section respectively coacting with a tapering portion and a cylindrical (or prismatic) portion of an insert defining therewith a pressure-regulating gap of adjustable width and a substantially invariable throttling passage. A spray head in the duct above the insert irrigates the gases descending through the nozzle into a separating compartment in which they undergo a sharp change of direction whereby they are freed from accompanying solids wetted by the spray. The stem of the insert, rising within that separating compartment, carries an apertured barrier spaced from the nozzle outlet with a clearance whose width varies inversely with that of the pressure-regulating gap.

9 Claims, 4 Drawing Figures

APPARATUS FOR DISCHARGING FLUE GASES FROM BLAST FURNACES AND THE LIKE

CROSS-REFERENCE TO RELATED APPLICATION

This application a continuation-in-part of our copending application Ser. No. 235,208 filed March 15, 1972.

FIELD OF THE INVENTION

Our present invention relates to an apparatus for the removal of high-pressure waste gases from blast furnaces or the like preparatorily to utilizing them at reduced pressure in, say, a heat exchanger or a burner.

BACKGROUND OF THE INVENTION

Flue gases from modern blast furnaces may exit at a pressure of about 3.5 atmospheres (absolute), so that a substantial pressure reduction is necessary to bring them down to atmospheric level.

In view of the high temperatures involved, conventional throttle valves are not suitable for this purpose. In our prior U.S. Pat. No. 3,726,065 we have disclosed a system for scrubbing such waste gases in a wash tower equipped with pressure sensors upstream and downstream of an adjustable accelerator gap formed within the tower by a nozzle with tapering insert of the general type described in U.S. Pat. Nos. 3,140,163 and 3,199,267, the gases passing through this gap being wetted by one or more spray heads overlying the nozzle. The sensors control the gap width so as to maintain a substantial output pressure in the face of a varying input pressure.

The apparatus described in our copending application Ser. No. 235,208 is designed to provide an improved nozzle construction for the purpose set forth which positively maintains a substantially invariable minimal flow resistance so as to throttle the gas flow even under conditions of abnormally low input pressure (e.g. upon start-up of the plant); this despenses with the need for a special control circuit of the type disclosed in our prior patent which in the presence of such low pressure switches to an alternate mode of operation designed to maintain a constant pressure differential across the gap.

For that purpose, the tapering insert in the apparatus of our copending application is provided within the tubular nozzle body with a downstream extension of a substantially constant cross-section, i.e., of cylindrical or prismatic shape, coacting with a geometrically similar section of the nozzle body to define therewith a restricted annular passage whose axial length preferably equals or exceeds that of the annular gap. Thus, a relative axial shifting of the insert and the surrounding nozzle body widens or narrows the adjustable gap around the tapering portion but has only a negligible effect on the flow resistance of the restricted passage defined by the extension of the insert.

As further disclosed in our copending application, several tapering insert portions of approximately the same axial length may be cascaded in as many converging nozzle sections to multiply the regulating effect of a single gap.

OBJECTS OF THE INVENTION

An object of this invention is to provide improved means in such an apparatus for facilitating the substantially noiseless depressurization of the gas flow down to very low pressure levels.

Another object is to increase the sensitivity of the pressure-adjustment means in a system embodying this type of apparatus.

SUMMARY OF THE INVENTION

According to a feature already disclosed in our copending application Ser. No. 235,208, the restricted passage following the variable gap or gaps is provided with flow-retarding means in the form of discontinuities, such as grids or perforated barrier disks transverse to the flow path, designed to generate turbulence with resulting additional energy loss according to the Carnot principle.

According to a more particular feature of our invention, such a grid, barrier disk or similar apertured flow retarder may also be disposed within a downstream compartment between the nozzle outlet and a point at which the gas flow is sharply deflected in order to be separated from substantially all accompanying solid particles wetted by droplets of water from one or more spray heads upstream of the nozzle. Thus, the flow retarder may be disposed below the substantially horizontal axis of a lateral exit port of this compartment, preferably at an adjustable distance from the nozzle outlet for final adjustment of the pressure in the compartment. In fact, pursuant to still another feature of our invention, this flow retarder may be carried on a stem of the nozzle so as to be raised or lowered together with the latter, its spacing from the nozzle outlet then varying inversely with the width of the pressure-regulating gap whereby the effect of the changing gap width upon the flow velocity is partly offset by the opposite change in the width of the clearance separating the nozzle from the apertured barrier.

We have found that, throughout the range of adjustment, the velocity of the exiting waste gases can be held in this way to less than the speed of sound so that the noise level is surprisingly low.

BRIEF DESCRIPTION OF THE DRAWING

The above and other features of our invention will be described in detail hereinafter with reference to the accompanying drawing in which.

SPECIFIC DESCRIPTION

Figure 1:
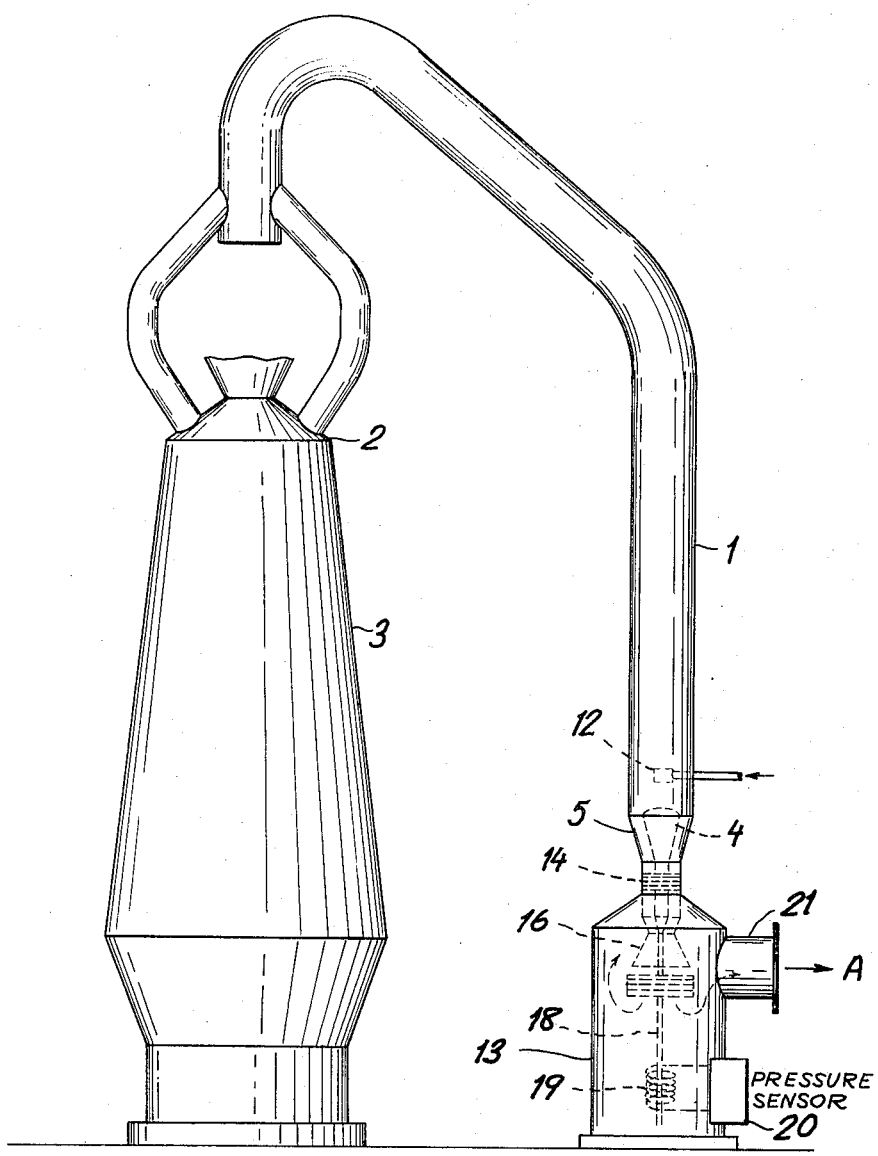
FIG. 1 is a somewhat diagrammatic elevational view of a plant including a blast furnace equipped with a system for the depressurization of its flue gases in accordance with our invention.
Figure 2:
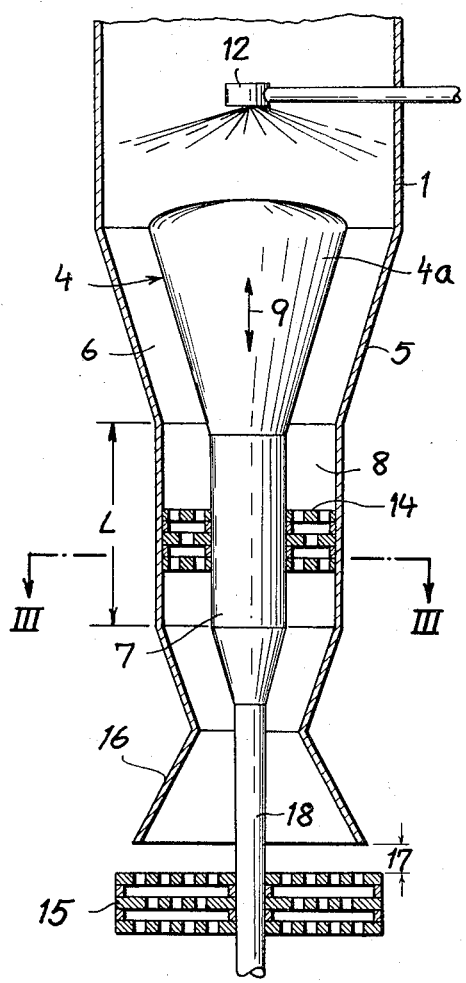
FIG. 2 is an axial sectional view, drawn to a larger scale, of a flow-regulating nozzle forming part of the system of FIG. 1.

The plant shown in FIG. 1 comprises a blast furnace 3 with a flue 2 from which a duct 1 carries high-pressure waste gases to a depressurizing apparatus embodying our invention. The apparatus includes a nozzle body 5, formed integral with the lower end of duct 1, surrounding an insert 4 with all-around clearance. As best seen in FIG. 2, the upper part 4a of this insert has a wider upstream end and a narrower downstream end so as to have downwardly tapering configuration geometrically similar to that of the surrounding nozzle section with which it defines a gap 6 of variable width. A cylindrical part 7, forming a downward extension of tapering insert portion 4a whose width equals that of the downstream end of that portion, defines with a surrounding portion of the nozzle body an annular passage 8 of constant width and of a length L substantially equaling that of gap 6. Insert 4 is integral with a stem 18 which rises from the base of a separating compartment 13 and can be raised or lowered, as indicated by an arrow 9, with the aid of actuating means in the form of a solenoid 19 within compartment 13. A pressure sensor 20 detects the outlet pressure of the gases issuing from the nozzle and energizes the solenoid in a sense tending to keep that outlet pressure substantially constant.

A spray head 12, overhanging the insert 4 within the duct 1, irrigates the descending gas stream and cools it; the resulting steam moves with the gas through the gap 6 and the passage 8, expanding at the nozzle outlet and precipitating onto the entrained solids. Compartment 13 has an exit port 21 above the level of that outlet so that the gas must abruptly change direction in order to escape, thereby shedding the wetted particles which are collected on the bottom of compartment 13 in a trough not shown.

Figure 3:
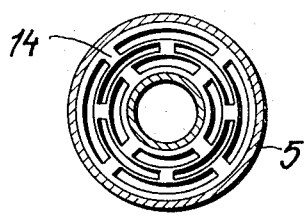
FIG. 3 is a cross-sectional view taken on the line III — III of FIG. 2.

In accordance with our present invention, a flow retarder 14 in the form of a perforated barrier is inserted in the annular passage 8 for the purpose of creating turbulence and lowering the gas pressure downstream of nozzle 5. This flow retarder consists of several vertically spaced annular disks with relatively offset apertures, as disclosed in our copending application Ser. No. 235,208; in the specific embodiment illustrated, these apertures are arcuate slots as best seen in FIG. 3. The retarder could also be designed as a stack of grids, or as several mutually offset sets of baffles at different levels.

Barrier 14 may be carried either on the inner wall of nozzle 5 or on the cylindrical part 7 of insert 4. A similar barrier 15, mounted on the stem 18 of that insert, defines a variable clearance 17 with a skirt 16 forming the outlet of nozzle 5. This clearance 17 increases upon a lowering of insert 4, i.e., simultaneously with a narrowing of gap 6, and vice versa. Thus, the raising of insert 4 exerts a throttling effect upon the intensified flow traversing the enlarged gap 6 whereby the overall change in pressure differential is reduced.

A small fraction of the gas impinging on the upper surface of barrier 15 is deflected directly into the laterally extending exit port 21 whose horizontal axis A coincides with the bottom plane of the nozzle, lying thus well above the underside of barrier 15. Most of the gas makes its way through that barrier and then changes direction to reach the exit port 21 as indicated by the arrows in FIG. 1. In each instance there occurs the aforedescribed sharp change in the flow direction with resulting separation of entrained water particles.

Figure 4:
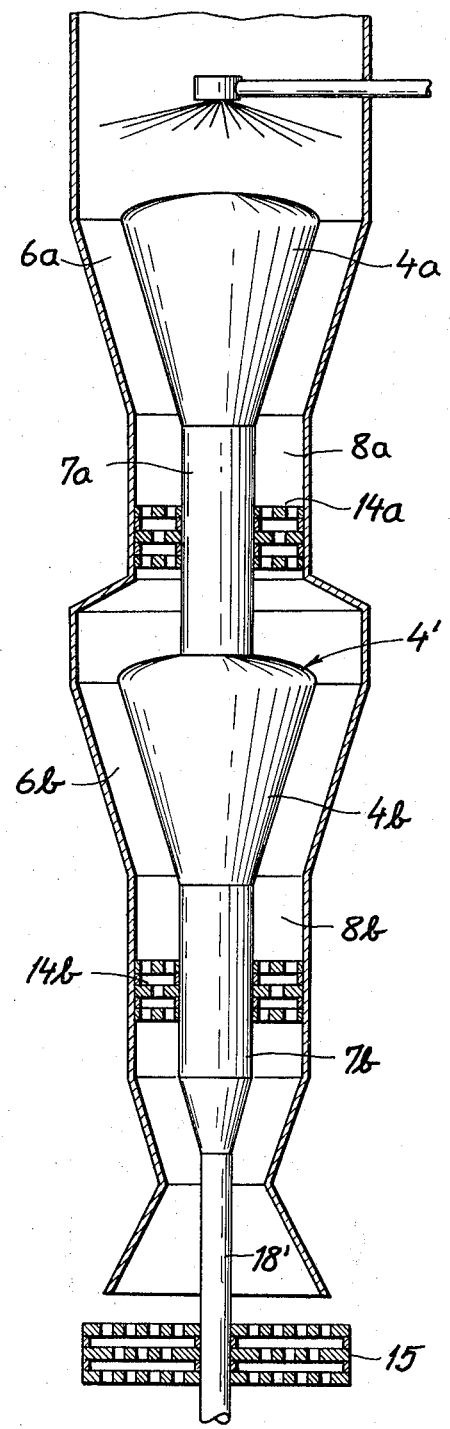
FIG. 4 is a view similar to FIG. 2, showing a modification.

As illustrated in FIG. 4, an insert 4' may be provided with several tapering portions 4a, 4b alternating with cylindrical (or prismatic) portions 7a, 7b. This subdivides the adjustable gap into two zones 6a, 6b whose width, owing to the identical vertex angle of the tapers, varies identically upon axial motion of the insert. Unaffected by this motion are annular passages 8a, 8b of substantially constant cross-section surrounding the cylindrical portions 7a, 7b.

The apparatus of FIG. 4 comprises two perforated barriers 14a and 14b in passages 8a and 8b, respectively, which may again be fixed to the nozzle wall or mounted on the insert 4'. In this case, too, a separate barrier 15 on stem 18' extends with variable spacing below the nozzle outlet to counteract the velocity-changing effect of any modification of the width of gaps 6a and 6b.

The described arrangement enables a finer adjustment of the pressure differential inasmuch as a relatively slight vertical shift of the insert 4 or 4' substantially changes the width of gap 6 (or 6a, 6b); such a shift, however, has only a negligible effect upon the length and therefore the flow resistance of passage 8 (or 8a, 8b). In view of the limited displaceability of the insert, its straight part 7 (or 7a, 7b) as well as the surrounding nozzle portion could also be slightly conical or pyramidal (rather than exactly cylindrical or prismatic) without materially altering the described mode of operation.

We claim:

1. An apparatus for depressurizing high-pressure waste gases, comprising:

a separating compartment provided with an exit port;

a duct having an inlet connected to a source of waste gases to be depressurized, said duct terminating in a nozzle with a first section converging toward an outlet which opens into said compartment and an elongated second section of substantially constant cross-section between said first section and said outlet;

an insert extending coaxially with all-around clearance into said nozzle from said compartment, said insert having a tapering portion with a wider upstream end and a narrower downstream end defining with said first section a regulating gap of a width depending upon the relative axial position of said insert and said nozzle, said insert further having a substantially straight part axially adjoining said narrower downstream end of said tapering portion and defining with said second section a restricted passage of substantially constant width exerting upon said gases a throttling effect substantially independent of said axial position;

turbulence-generating means surrounding said insert straight section downstream of said gap; and control means for varying said relative axial position, said turbulence-generating means comprising a perforated barrier with several levels of relatively offset perforations in said passage.

2. An apparatus as defined in claim 1 wherein said control means comprises pressure-sensing means at said outlet and actuating means for said nozzle responsive to an output of said pressure-sensing means for displacing said insert in a sense tending to maintain a substantially constant gas pressure in said outlet.

3. An apparatus as defined in claim 1 wherein said passage has a minimum axial length substantially equaling that of said gap.

4. An apparatus as defined in claim 1 wherein said turbulence-generating means includes an apertured barrier with several levels of relatively offset apertures on an extension of said insert downstream of said nozzle.

5. An apparatus as defined in claim 4 wherein said barrier is spaced from said outlet by a narrow clearance varying in width inversely with said gap upon operation of said control means.

6. An apparatus as defined in claim 3 wherein said nozzle enters said compartment from above and is centered on a generally vertical axis, said outlet being located below said passage, said exit port extending laterally from said compartment with a substantially horizontal axia above the level of the underside of said barrier.

7. An apparatus as defined in claim 6, further comprising spray means in said duct above said nozzle for wetting said gases to facilitate the shedding of moisture-laden solids therefrom in said compartment.

8. An apparatus as defined in claim 1 wherein said nozzle is provided with a third section ahead of said first section, converging toward said outlet at substantially the same angle as said first section, and a fourth section of substantially constant cross-section between said first and third sections; said insert having another tapering portion, defining with said third section another regulating gap of a width substantially equaling that of the first-mentioned gap, and another substantially cylindrical part defining with said fourth section another restricted passage of substantially invariable throttling effect.

9. An apparatus as defined in claim 8 wherein said flow-retarding means comprises a perforated barrier in each of said passages.

* * * * *